United States Patent
Spezzani (10) Patent No.: US 10,961,149 B2
(45) Date of Patent: Mar. 30, 2021

(54) MACHINE AND METHOD FOR CLEANING GLASS ARTICLES

(71) Applicant: KERAGLASS INDUSTRIES S.R.L., Baiso (IT)

(72) Inventor: Stefano Spezzani, Baiso (IT)

(73) Assignee: KERAGLASS INDUSTRIES S.R.L., Basio (IT)

( * ) Notice: Subject to any disclaimer, the term of this patent is extended or adjusted under 35 U.S.C. 154(b) by 350 days.

(21) Appl. No.: 15/962,075

(22) Filed: Apr. 25, 2018

(65) Prior Publication Data
US 2018/0312433 A1 Nov. 1, 2018

(30) Foreign Application Priority Data

Apr. 27, 2017 (IT) .......................... 102017000045832
Sep. 26, 2017 (IT) .......................... 102017000107679

(51) Int. Cl.
| | | |
|---|---|---|
| C03C 23/00 | (2006.01) | |
| B08B 7/00 | (2006.01) | |
| C03C 17/00 | (2006.01) | |
| B65G 13/07 | (2006.01) | |
| B08B 11/04 | (2006.01) | |

(52) U.S. Cl.
CPC ........ *C03C 23/0075* (2013.01); *B08B 7/0071* (2013.01); *B08B 11/04* (2013.01); *B65G 13/07* (2013.01); *C03C 17/002* (2013.01); *C03C 23/007* (2013.01); *C03C 17/003* (2013.01); *C03C 2217/72* (2013.01)

(58) Field of Classification Search
None
See application file for complete search history.

(56) References Cited

U.S. PATENT DOCUMENTS

| | | | | |
|---|---|---|---|---|
| 2,382,470 A | * | 8/1945 | Eakins | G07F 17/163 |
| | | | | 194/227 |
| 2,383,470 A | | 8/1945 | Morgan | |
| 2008/0216513 A1 | * | 9/2008 | Sato | C03C 23/007 |
| | | | | 65/28 |

FOREIGN PATENT DOCUMENTS

| | | | | |
|---|---|---|---|---|
| DE | 3031160 A1 | 4/1982 | | |
| DE | 19725861 A1 | 1/1998 | | |
| DE | 19740625 A1 | 3/1999 | | |
| DE | 102005006903 A1 | 8/2006 | | |
| EP | 2698453 A1 | * | 2/2014 | C03C 17/02 |
| EP | 2698453 A1 | 2/2014 | | |
| FR | 978448 A | 4/1951 | | |
| FR | 1209663 A | * | 3/1960 | B08B 11/04 |
| FR | 1209663 A | 3/1960 | | |
| FR | 2284844 A1 | 4/1976 | | |

(Continued)

OTHER PUBLICATIONS

European Search Report dated Aug. 31, 2018, in corresponding European Application No. 18166596.

(Continued)

*Primary Examiner* — Cachet I Proctor
(74) *Attorney, Agent, or Firm* — Browdy and Neimark, PLLC (57) ABSTRACT

Cleaning machine (20) of glass articles (G), comprising:
a support (21) for supporting a glass article (G); and
a heating device (22, 25) located in the vicinity of the support (21), at a distance therefrom, and configured to emit a heat flow (F, H) in the direction of a surface (G1) of the glass article (G) supported by the support (21).

17 Claims, 10 Drawing Sheets

(56) References Cited

FOREIGN PATENT DOCUMENTS

GB          1517189 A  *  7/1978   ............... C21D 9/63
WO       2006114440 A1    11/2006
WO       2015/001257 A1    1/2015

OTHER PUBLICATIONS

Italian Search Report for Italian priority application No. IT 201700107679 dated Jun. 15, 2018.

* cited by examiner

MACHINE AND METHOD FOR CLEANING GLASS ARTICLES

TECHNICAL FIELD

The present invention relates to a machine and a method for cleaning glass articles, such as flat glass or hollow glass panes (such as jars or similar containers).

PRIOR ART

As is known, with the advent of increasingly advanced techniques of decoration of glass articles, for example by using high definition digital printing machines which provide for the deposition of tiny drops of ink onto the glass article surface to be decorated, the need to pre-treat the surface to be decorated by cleaning it accurately has become stronger.

In practice, the increasingly urgent need is known to remove any impurities, such as fatty impurities, from the surface to be decorated by cleaning prior to printing the decoration, as these impurities affect the local surface tension of the surface to be decorated and result in unevenness in the distribution of ink drops and, therefore, may lead to flaws in the realized decoration.

A need felt, therefore, is to increase the level of cleanliness of the surface of glass articles to be decorated, thereby making the process more efficient and reducing the use of operators. Another need felt relates to the reduction of the use of liquids and detergents (with the respective plants).

Moreover, especially in the field of flat glass sheet articles, the use of a glass article protection technique has become widespread, for example for protecting the glass from possible damages caused by various processes performed prior to the hardening process. This protection technique involves the application of a protective coating on the exposed surface of the glass article that protects the glass article during the various processing steps, such as cutting, grinding, drilling or the like.

When the glass article is subsequently introduced into the hardening furnace, this protective coating must:
  either be removed from the glass article, resulting in a waste of time for the operators,
  or be subjected to heat treatment in the furnace itself that actually causes the removal thereof, however in such a second condition undesired residues accumulate in the hardening furnace resulting from such a coating which may impair the level of cleanliness of the hardened glass and the hardening furnace.

Therefore, a further need felt in the field of processing of glass articles is to make the removal of the protective coating particularly effective and fast quick without impairing the internal environment of the hardening furnace and/or appearance of the hardened glass article.

One object of the present invention is to meet said needs of the prior art with a simple, rational and cost-effective solution.

These objects are achieved by the features of the invention described in the independent claim. The dependent claims describe preferred and/or particularly advantageous aspects of the invention.

DESCRIPTION OF THE INVENTION

The invention, in particular, provides a machine for cleaning glass articles, comprising:
  a support for supporting a glass article; and
  a heating device located in the vicinity of the support, at a distance therefrom, and configured to emit a heat flow (such as a flame or a hot fluid flow) in the direction of a surface of the glass article so as to impinge such a surface with the heat flow.

With this solution, the dirt residues such as grease stains, fats or oils present on the surface, as well as any coatings applied on the surface, can be removed quickly and efficiently from the surface of the glass article by using the heat input and the turbulent heat flow.

In addition, with this solution, the surface of the glass article impinged by the heat flow is simultaneously heated efficiently and quickly.

Therefore, the glass article with the surface thus cleaned and preheated can be subjected to further processing steps, such as surface decoration and/or hardening of the whole glass article more efficiently and accurately than is the case with known machines.

According to an aspect of the invention, the heating device comprises an element that emits the heat flow comprising a body that is elongated along a longitudinal axis provided with a cylindrical axial cavity and with an elongated through slit, which through slit places in communication the interior of the axial cavity with the exterior of the elongated body of the emitter element and faces towards the support so as to emit the heat flow which, from the interior of the axial cavity, comes out through the elongated slit and is mainly directed in the radial direction with respect to the longitudinal axis of the emitter element.

With this solution, the configuration of the emitter element allows to impinge in an effective, fast and uniform manner the entire surface to be treated decreasing the heat stresses on the treated glass article.

Advantageously, the heating device can comprise a plurality of elements that emit the heat flow, elongated and with longitudinal axes that are mutually parallel and coinciding or offset, so as to cover an entire width of the surface of the glass article.

For example, each emitter element comprises an elongated slit facing the support and adapted to emit the heat flow towards the surface of the glass article.

Preferably, if said emitter elements are mutually parallel and offset, the projection of each elongated slit on the longitudinal axis of an adjoining elongated slit is adjacent and not superposed to said adjoining elongated slit.

With this solution, the heat flow (be it a flame or a flow of hot fluid) emitted by the emitter element is defined by a homogeneous layer (formed by a plurality of layers that are not superposed and not separate from each other) which impinges the surface of the glass article homogeneously and effectively.

Alternatively, the heating device can consist of a single emitter element.

Advantageously, the heating device, or each emitter element, may comprise a gas burner; the heat flow, in this case, is a flame that is emitted by the burner in the direction of the surface of the glass article supported by the support. Preferably, the burner may be a linear burner arranged with horizontal longitudinal axis aligned to a first horizontal direction.

Alternatively, the heating device, or each emitter element, may comprise a thermo-blower; the heat flow, in this case, is a flow of a hot fluid, preferably hot air, which is emitted by the thermo-blower in the direction of the surface of the glass article. Preferably, the thermo-blower may be elongated and arranged with horizontal longitudinal axis aligned to a first horizontal direction.

In any case, the support may comprise a horizontal support surface that comprises feeding means for feeding the supported glass article along a predetermined feeding direction, preferably orthogonal to the first direction.

With this solution, the entire surface of the glass article can be impinged by the thermal flow emitted by the heating device.

Advantageously, the feeding means may comprise a roller conveyor, whose rollers globally define the support surface.

This solution allows implementing a very simple and versatile cleaning machine.

For the same purposes set out above, a further aspect of the invention provides a plant for treating glass articles, comprising:
  a cleaning machine, as described above, and
  a treatment device—located downstream of the cleaning machine—configured to treat the glass article exiting from the cleaning machine, i.e. the glass article whose surface has been impinged by the heat flow emitted by the heating device of the cleaning machine.

Advantageously, the treatment device comprises (or consists of) a decorating machine—located directly downstream of the cleaning machine—configured to lay a decoration on the surface of the glass article exiting from the cleaning machine. Alternatively or additionally, the treatment device comprises (or consists of) a hardening furnace of the glass article—located downstream of the cleaning machine—configured to perform a hardening treatment on the glass article exiting from the cleaning machine.

In this circumstance, any protective coating that lines the surface of the glass article is impinged by the heat flow, i.e. by the burner flame or by the hot fluid flow from the thermo-blower of the cleaning machine, and is thermally removed by the heat flow itself before the glass article enters the hardening furnace.

In addition, the clean glass article that enters the hardening furnace is pre-heated by the heat flow emitted by the heating device.

Moreover, for the same purposes set out above, a further aspect of the invention provides a method for cleaning glass articles, preparatory to a further treatment of the glass article, wherein the method comprises the steps of:
  arranging a glass article; and
  impinging a surface of the glass article with a heat flow (i.e. a flame or a hot fluid flow).
  Advantageously, the method may comprise the step of:
  decorating the surface of the glass article that has previously been impinged by the heat flow.
  Alternatively or additionally, the method may comprise the step of:
  subjecting the glass article whose surface has been impinged by the heat flow to a hardening treatment.

BRIEF DESCRIPTION OF THE DRAWINGS

Further features and advantages of the invention will become apparent from the following description, provided by way of non-limiting example with the aid of the figures shown in the accompanying drawings.

BEST EMBODIMENT OF THE INVENTION

With particular reference to the above figures, reference numeral 10 collectively denotes a plant for the treatment of glass articles, collectively referred to by letter G.

The plant 10 comprises a cleaning machine 20 of a surface G1 of the glass articles G.

Figure 3A:
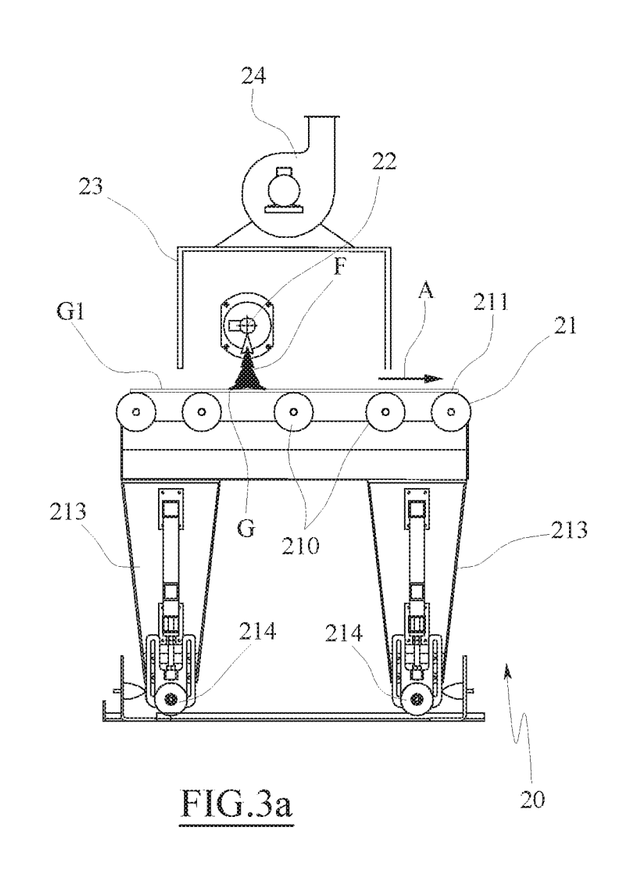
FIG. 3*a* is a view of detail III in FIG. 1 according to a first embodiment of the cleaning machine according to the finding.
Figure 4A:
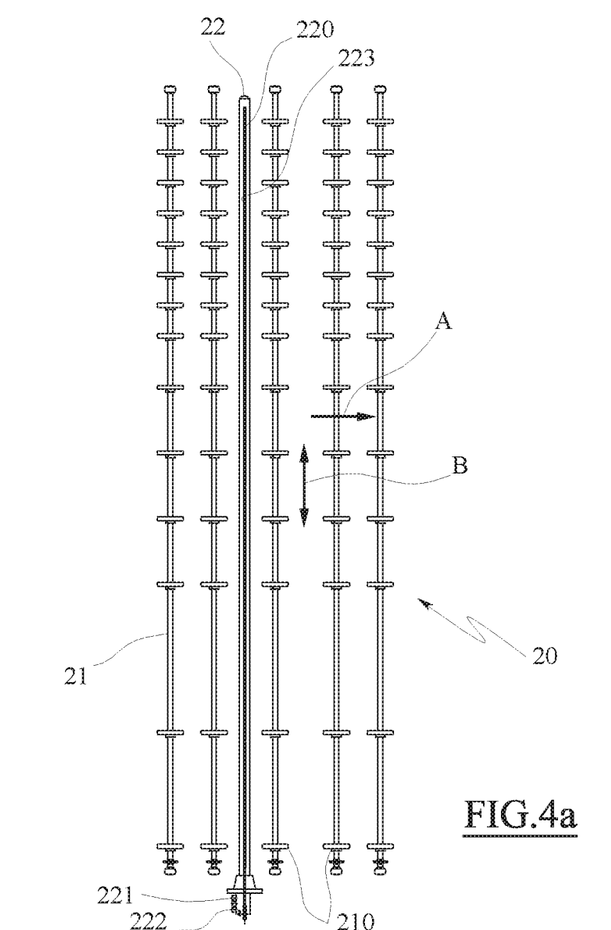
FIG. 4*a* is a plan bottom view of FIG. 3*a*.
Figure 5A:
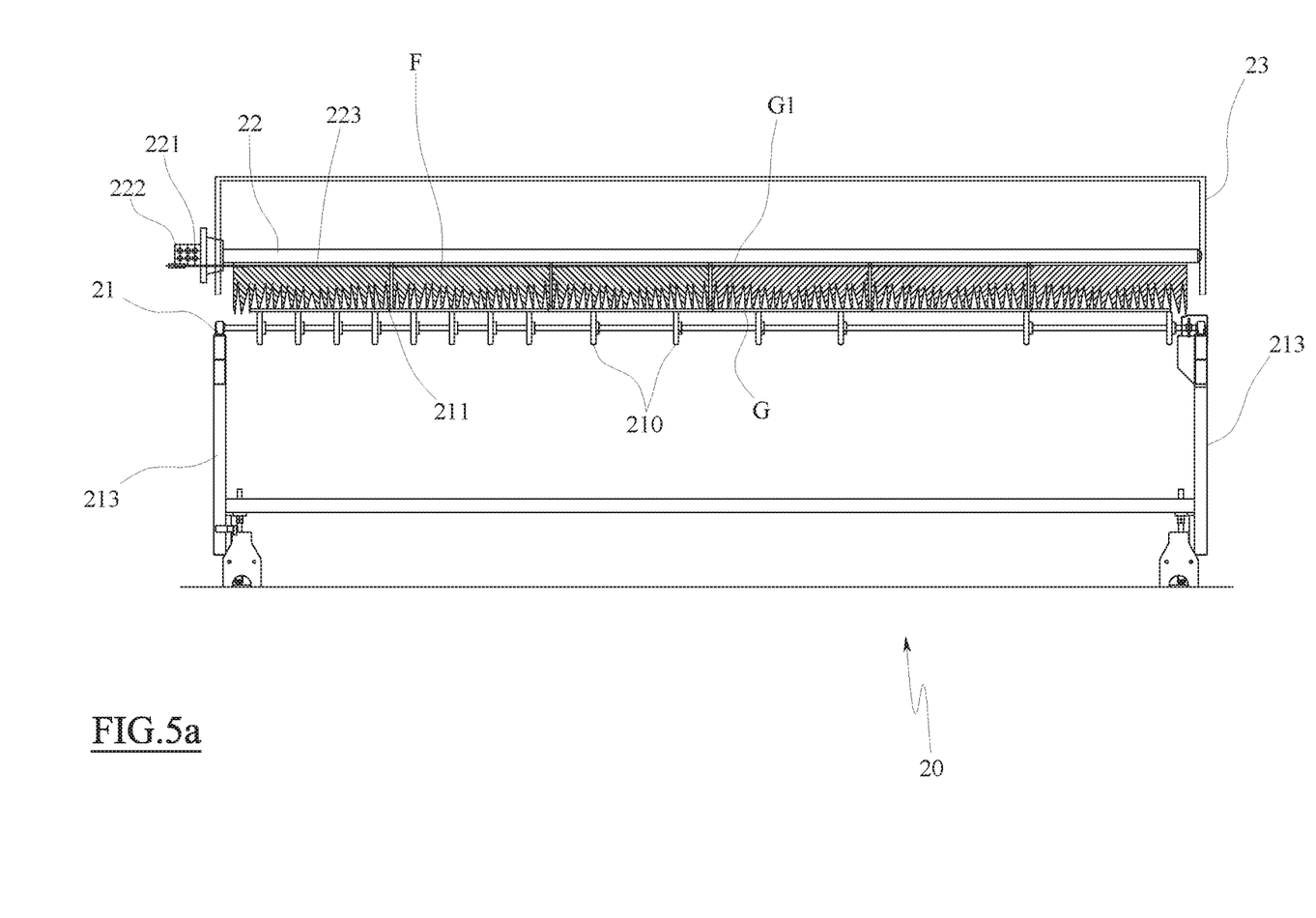
FIG. 5*a* is a front elevational view of FIG. 3*a*.

In a first embodiment shown in detail in FIGS. 3*a*, 4*a* and 5*a*, the cleaning machine 20 comprises a roller conveyor 21, which is generally provided with a plurality of rollers 210 arranged mutually parallel and mutually coplanar to define a horizontal support surface 211 for the glass articles G to be subjected to cleaning. The rollers 210 of the roller conveyor 21 are connected to a motor (not shown), by means of return members such as chains or belts, which motor is adapted to rotate them on themselves so as to feed the glass articles G in a predetermined horizontal feeding direction (orthogonal to the axis of rotation of rollers 210).

The rotation speed of the rollers 210 regulates the feeding speed of the glass articles G along the feeding direction A, which can be set according to the type of process to impart to surface G1 and/or to the glass article G.

The roller conveyor 21 is provided with ground supports 213 provided with wheels 214 that allow the movement of the roller conveyor 21 itself, preferably along a direction parallel to the feeding direction A imposed by rollers 210 to the glass articles G.

The roller conveyor 21, i.e. the support surface 211 defined thereby, is height adjustable by known means.

The cleaning machine 20 further comprises a natural gas burner 22.

The burner 22 is a linear burner and comprises an elongated body along a longitudinal axis provided with an axial cylindrical (through) cavity 220.

The axial cavity 220, which defines a combustion chamber of the burner 22, communicates with a first inlet conduit 221 for the supply of a fuel gas and with a second inlet conduit 222 for the supply of a combustive gas, such as air.

The first inlet conduit 221 and the second inlet conduit 222 are connected to the axial cavity 220 at a (single) axial end thereof.

The fuel gas and/or the combustive gas are respectively fed by a suitable feeding circuit of a known type, configured to feed a dosed amount of such gases for the optimal (rich in combustive agent) combustion of the same into the axial cavity 220.

The body of burner 22 comprises an elongated through slit 223, for example extending along the entire body of burner 22, which elongated slit 223 puts the interior of the axial cavity 220 in communication with the exterior of the body of burner 22.

The elongated slit 223 faces towards the support surface 211 defined by the roller conveyor 21 and is adapted to emit a flame F, generated by the combustion of fuel gas in the presence of combustive gas which from the inside of the axial cavity 220 come out through the elongated slit 223 and is mainly directed in the radial direction with respect to the longitudinal axis of the (vertical) burner 22.

The flame F defines a thermal flow coming out of the burner 22 and is directed towards the surface G1 of the glass article G.

The flame F, i.e. the thermal flow defined thereby, may have a direction mainly orthogonal to the surface G1.

Alternatively, the flame F, i.e. the thermal flow defined thereby, may have a direction mainly inclined with respect to the surface G1, incident therewith, with an inclination facing towards the rear zone of the glass article G with respect to the feeding direction A of the glass article G on the roller conveyor 21.

In this case, the heat flow generated by the flame F contributes to pushing dirt residues and combustion articles away from the surface G1 of the glass article G, removing them from the subsequent processing stations thereof.

The flame F may have an elongated shape with a longitudinal axis parallel to the longitudinal axis of the burner 22 and be substantially shaped as a curtain propagating (in a substantially radial direction) from the elongated slit 223.

The flame F may have a length equal to or less than the length of the elongated slit 223.

It is possible to divide the longitudinal axis of the burner 22 and/or the elongated slit 223 into different axial sections and provide for the combustion, and thus the emission of the flame F, to only occur at a part of the axial sections above the glass article G to be treated.

The flame F has a temperature of between 900° C. and 1400° C., preferably between 1200° C. and 1400° C., and is a flame produced by a mixture rich in oxygen that does not produce soot and whose color is produced by the emission of molecular radicals.

Within the axial cavity 220 or immediately outside it, at the axial slit 223, means for generating a spark of a known type are arranged.

The burner 22, as described above, is placed above the roller conveyor 21 with a horizontal longitudinal axis and aligned with a first horizontal direction B parallel to the axis of rollers 210 of the roller conveyor 21.

The length of the burner 22 is substantially equal to the width of the roller conveyor 21, i.e. the width of the support surface 211.

The burner 22 is supported in this position by two lateral sides (not shown) which can be fixed to the ground supports 213 of the roller conveyor 21 or define themselves further ground supports, provided with wheels that allow the movement of burner 22 along a direction orthogonal to the longitudinal axis of the burner 22.

The burner 22 is arranged so that the elongated slit 223 is facing the support surface 211 of the roller conveyor 21, i.e. downwards, so as to project the flame F towards the upper surface G1 of the glass articles G placed on the support surface 211.

The burner 22 is arranged at a certain distance (vertical height) from the support surface 211, preferably adjustable by means of adjustment means of known type, so that a gap is defined between the support surface 211 and the elongated slit 223 of the burner 22 within which the glass article G can be inserted with large clearance.

With respect to the feeding direction A, the burner 22 is positioned in an intermediate stretch of the roller conveyor 21, ideally dividing it into an inlet section located upstream of the burner 22 and an outlet section located downstream of the burner 22.

The inlet section of the roller conveyor 21 may be provided with a centering system (not shown) which is adapted to guide the glass article G to take a predetermined position on the support surface 211.

The burner 22 may be contained and protected within an upper casing 23 which may also contain the respective adjustment means.

A suction system 24 may also be associated with the upper casing 23 adapted to suction the combustion fumes that are dispersed in the environment surrounding the burner 22 and/or the glass article G during treatment.

It is not excluded, moreover, that the cleaning machine 20 may comprise a plurality of burners 22 with mutually parallel longitudinal axes, either coincident (and thus aligned) or offset, so as to cover the entire span defined by the width of the roller conveyor 21, or by the width of the support surface 211.

Figure 12:
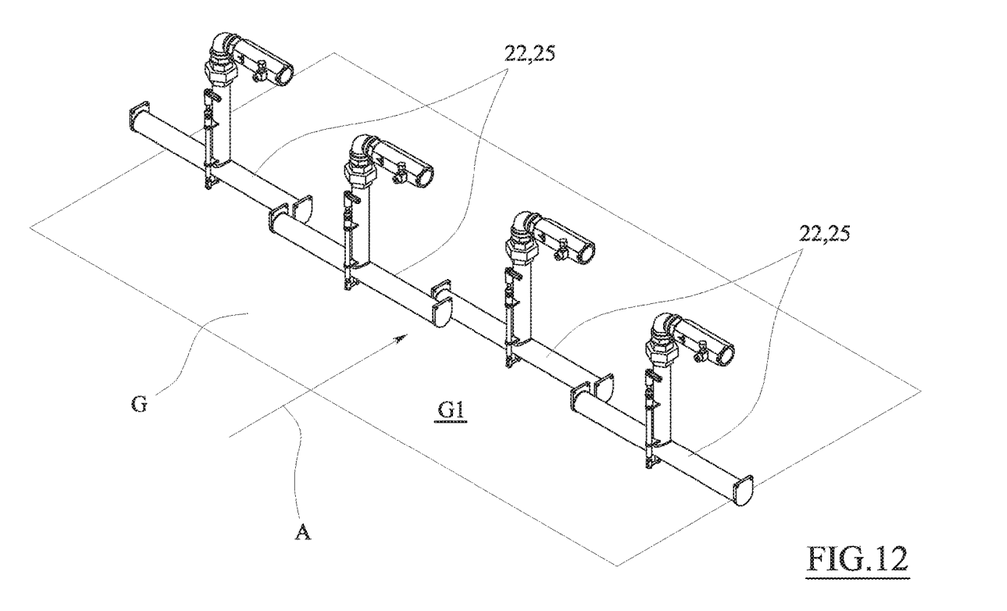
FIG. 12 is an axonometric view of an embodiment of the heating device according to the invention.
Figure 13:
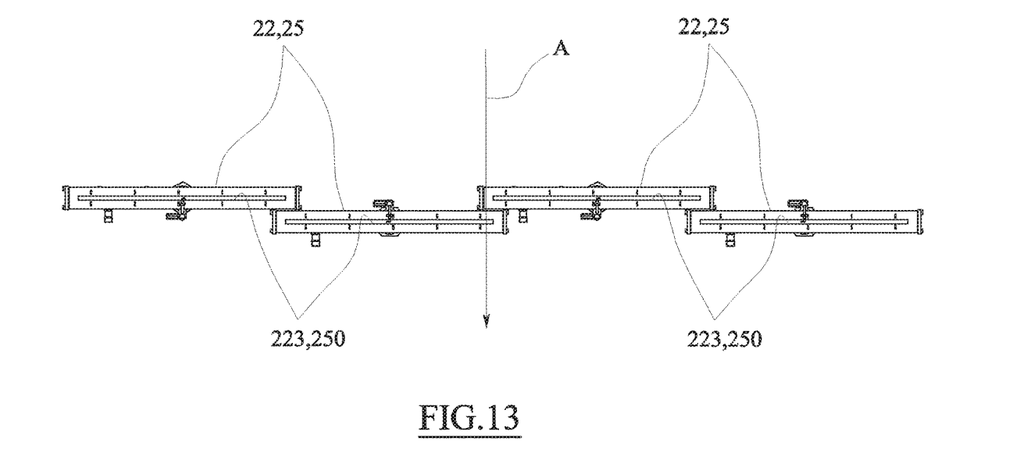
FIG. 13 is a bottom view of FIG. 12.

In the example shown in FIGS. 12 and 13, the cleaning machine 20 comprises a plurality of burners 22 (as described above) having longitudinal axes that are mutually parallel and offset.

In practice, the set of burners 22 is dimensioned in such a way as to cover throughout their length, the entire span defined by the roller conveyor 21, i.e. by the width of the support surface 211.

Each burner 22 has a respective elongated slit 223 oriented as described above. The length of the elongated slit 223 could extend over the entire length of the respective burner 22 or be slightly smaller with respect thereto.

However, the burners 22 of the plurality of burners 22 are arranged so that the projection of each elongated slit 223 on the longitudinal axis of an elongated slit 223 adjoining (proximal) thereto is adjacent and not superposed to said adjoining (proximal) elongated slit 223.

In practice, the projection of each elongated slit 223 on a (vertical) plane orthogonal to the direction of advance A of the glass article G on the roller conveyor 21 is not superposed and not separate (i.e. is adjacent) to the projection of the elongated slit 223 proximal thereto.

In the illustrated example, the longitudinal axes of two non consecutive burners 22, in which a single burner 22 is interposed, are coaxial.

The cleaning machine 20 may provide for the use of several burners 22 side-by-side along the feeding direction A so that the glass article G passes through flames F generated thereby in series.

The glass article G, that is, its surface G1, at the end of the cleaning carried out by flame F of the cleaning machine 20, has a temperature of between room temperature and 100° C., preferably between 60° C. and 80° C., for example due to the heating due to the action of the burner 22; this solution therefore offers the advantage of bringing the glass article G to the correct temperature for subsequent processing, avoiding the use of a separate heating system.

Figure 3B:
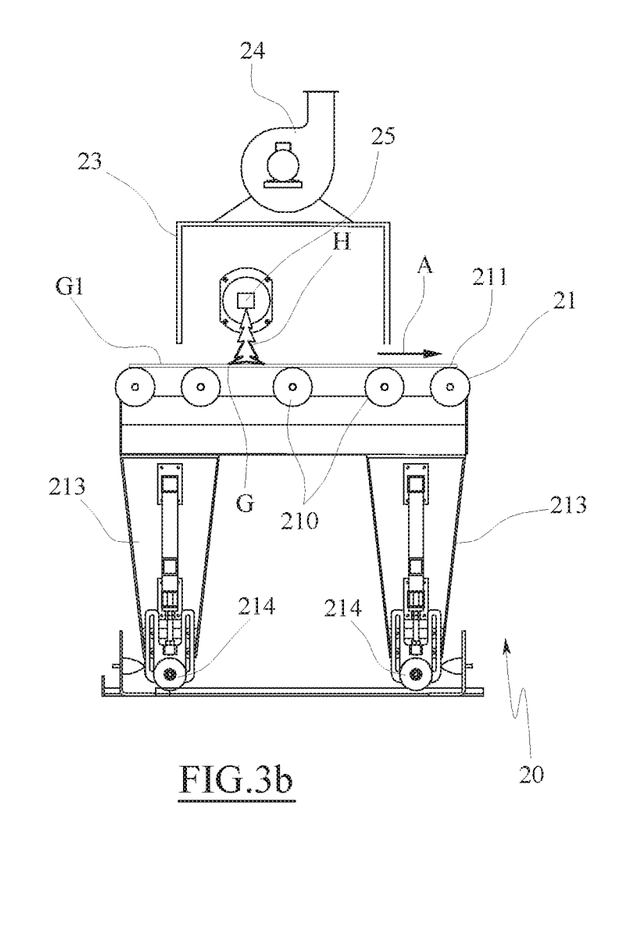
FIG. 3*b* is a view of detail III in FIG. 1 according to a second embodiment of the cleaning machine according to the finding.
Figure 4B:
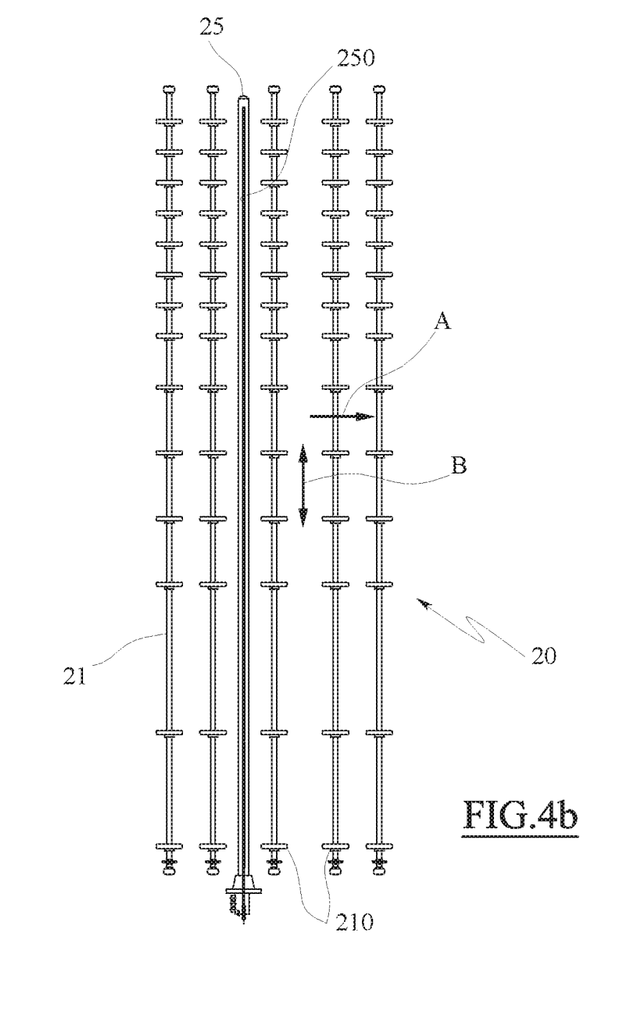
FIG. 4*b* is a plan bottom view of FIG. 3*b*.
Figure 5B:
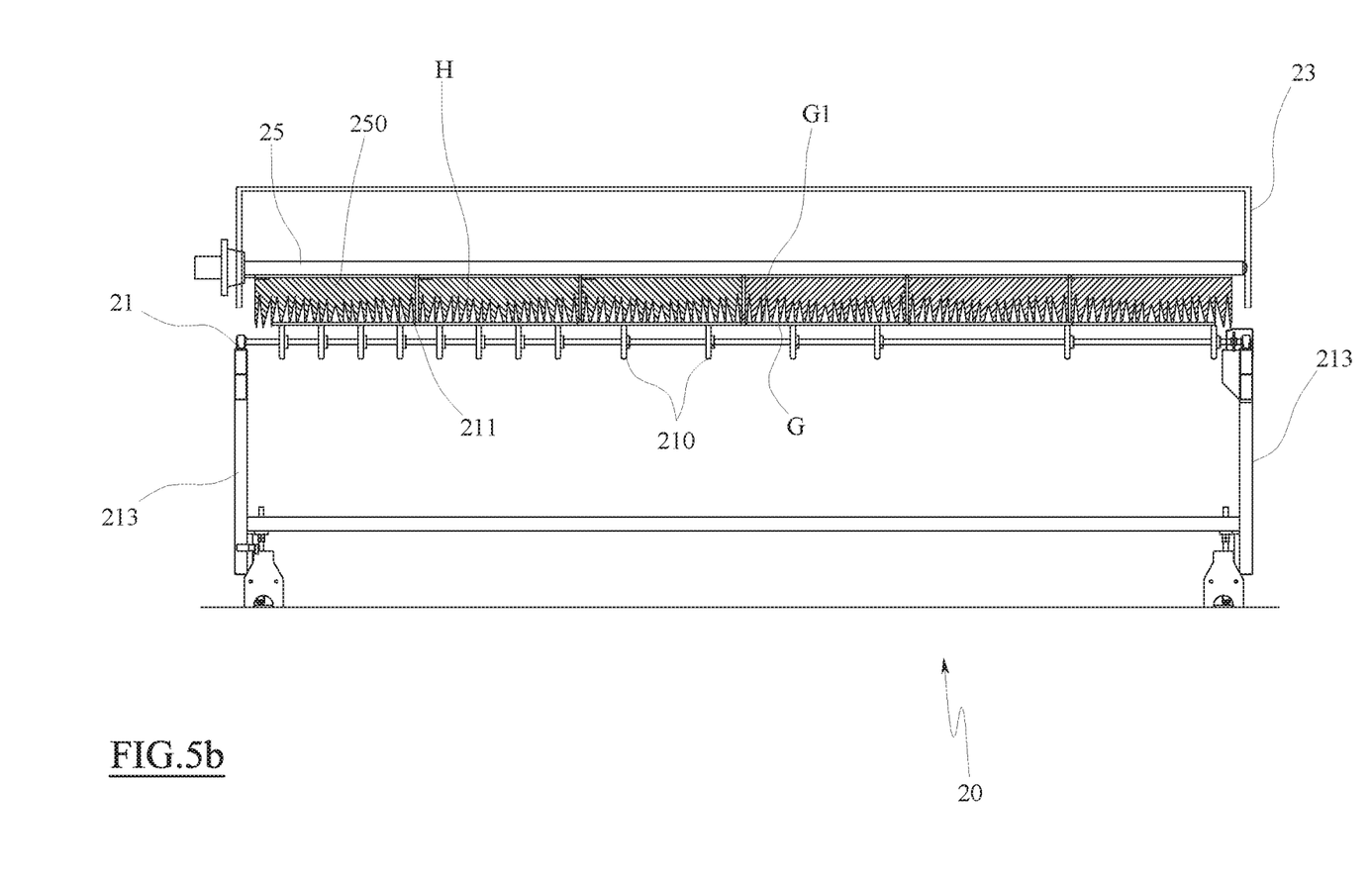
FIG. 5*b* is a front elevational view of FIG. 3*b*.

In an alternative embodiment shown only schematically in FIGS. 3b, 4b and 5b, the cleaning machine 22 could be provided, instead of burner 20 described above, with a thermo-blower 25, which is configured to emit a (turbulent) flow of a hot fluid H, such as hot air, directing it towards surface G1 of the glass article G. In this embodiment, in particular, the cleaning machine 20 comprises a roller conveyor 21 that is totally alike or similar to the roller conveyor 21 described above.

The thermo-blower 25 (also known as industrial dryer) of the cleaning machine 20 is placed above the support surface 211 of the roller conveyor 21 and is adapted to emit a flow of a hot fluid H on the surface G1 of the glass articles G placed on the support surface 211 of the roller conveyor 21.

The flow of hot fluid H, preferably hot air, defines a thermal flow coming out of the thermo-blower 25 and is directed towards the surface G1 of the glass article G.

The flow of hot fluid H, i.e. the thermal flow defined thereby, may have a direction mainly orthogonal to the surface G1.

Alternatively, the flow of hot fluid H, i.e. the thermal flow defined thereby, may have a direction mainly inclined with respect to the surface G1, incident therewith, with an inclination facing towards the rear zone of the glass article G with respect to the feeding direction A of the glass article G on the roller conveyor 21.

In this case, the heat flow generated by the flow of hot fluid H contributes to pushing the residues away from the surface G1 of the glass article G, removing them from the subsequent processing stations thereof.

The thermo-blower 25 is of linear type and comprises an elongated body along a longitudinal axis provided with an axial (through) cavity.

The body of the thermo-blower 25 comprises an elongated through slit, for example extending along the body of the thermo-blower 25, which elongated slit 250 puts the interior of the axial cavity in communication with the exterior of the body of the thermo-blower 25.

The elongated slit 250 faces towards the support surface 211 defined by the roller conveyor 21 and is adapted to emit the flow of hot fluid H that from the interior of the axial cavity comes out through the elongated slit 250, thereby defining an air curtain that impinges and brushes the surface G1 of the glass article G.

The flow of hot fluid H may have an elongated shape, with longitudinal axis parallel to the longitudinal axis of the thermo-blower 25, and may have a length equal to or less than the length of the elongated slit 250.

The longitudinal axis of the thermo-blower 25 and/or the elongated slit 250 may be divided into different axial sections and it may be contemplated that the emission of the flow of hot fluid H can only occur at a part of the axial sections, leaving other sections inactive (for example in a number that can be determined based on the size of the glass article G to be treated).

The flow of hot fluid H has a temperature of between 400° C. and 700° C., preferably between 500° C. and 600° C.

The thermo-blower 25, as described above, is placed above the roller conveyor 21 with a horizontal longitudinal axis and aligned with a first horizontal direction B parallel to the axis of rollers 210 of the roller conveyor 21.

The length of the thermo-blower 25 is substantially equal to the width of the roller conveyor 21, i.e. the width of the support surface 211.

The thermo-blower 25 is arranged at a certain distance (vertical height) from the support surface 211, preferably adjustable by means of adjustment means of known type, so that a gap is defined between the support surface 211 and the elongated slit 250 of the thermo-blower 25 within which the glass article G can be inserted with large clearance.

The thermo-blower 25 may be contained and protected within an upper casing 23 which may also contain the respective adjustment means and/or a suction system.

In this case, too, the cleaning machine 20 may comprise a plurality of thermo-blowers 25, with mutually parallel longitudinal axes, either coincident (and thus aligned) or offset, so as to cover the entire span defined by the width of the roller conveyor 21, or by the width of the support surface 211.

For example, the cleaning machine 20 can comprise a plurality of thermo-blowers 25 (as described above) having longitudinal axes that are mutually parallel and offset.

In practice, the set of thermo-blowers 25 is dimensioned in such a way as to cover, throughout their length, the entire span defined by the roller conveyor 21, i.e. by the width of the support surface 211.

Each thermo-blower 25 has a respective elongated slit 250 oriented as described above.

The length of the elongated slit 250 could extend over the entire length of the respective thermo-blower 25 or be slightly smaller with respect thereto.

However, the thermo-blowers 25 of the plurality of thermo-blowers 25 are arranged so that the projection of each elongated slit 250 on the longitudinal axis of an elongated slit 250 adjoining (proximal) thereto is adjacent and not superposed to said adjoining (proximal) elongated slit 250.

In practice, the projection of each elongated slit 250 on a (vertical) plane orthogonal to the direction of advance A of the glass article G on the roller conveyor 21 is not superposed and not separate (i.e. is adjacent) to the projection of the elongated slit 223 proximal thereto.

In the illustrated example, the longitudinal axes of two non consecutive thermo-blowers, in which a single thermo-blower 25 is interposed, are coaxial.

The glass article G, that is, its surface G1, at the end of the cleaning carried out by the flow of hot fluid H of the cleaning machine 20, has a temperature of between room temperature and 100° C., preferably between 60° C. and 80° C., for example due to the heating due to the action of the thermo-blower 25; this solution therefore offers the advantage of bringing the glass article G to the correct temperature for subsequent processing, avoiding the use of a separate heating system.

The plant 10 then comprises a treatment device configured to treat the glass article G exiting from the cleaning machine 20, i.e. located downstream of the cleaning machine itself in the feeding direction of the glass articles G along the feeding direction A imposed by the roller conveyor 21 of the cleaning machine 20.

The treatment device may be placed downstream of any cleaning machine 20 as described in both embodiments described above, i.e. whether it is provided with burner 22 or is provided with the thermo-blower 25.

In a first version shown in FIGS. 1, 2 and 6-10, the treatment device comprises a decorating machine 30, such as a printing machine, for the decoration of the glass articles G, i.e. of the surface G1 thereof that has been cleaned by the cleaning machine 20.

The decorating machine 30 also comprises a roller conveyor 31, which generally comprises a plurality of rollers 310, partly motorized, arranged mutually parallel and mutually coplanar to define a horizontal support surface 311 for the glass articles G to be subjected to decoration.

The feeding direction C imposed by the roller conveyor 31 of the decorating machine 30 is parallel to (and coincident with) the feeding direction A imposed by the roller conveyor 21 of the cleaning machine 20, see FIGS. 1-9.

Figures 10, 11:
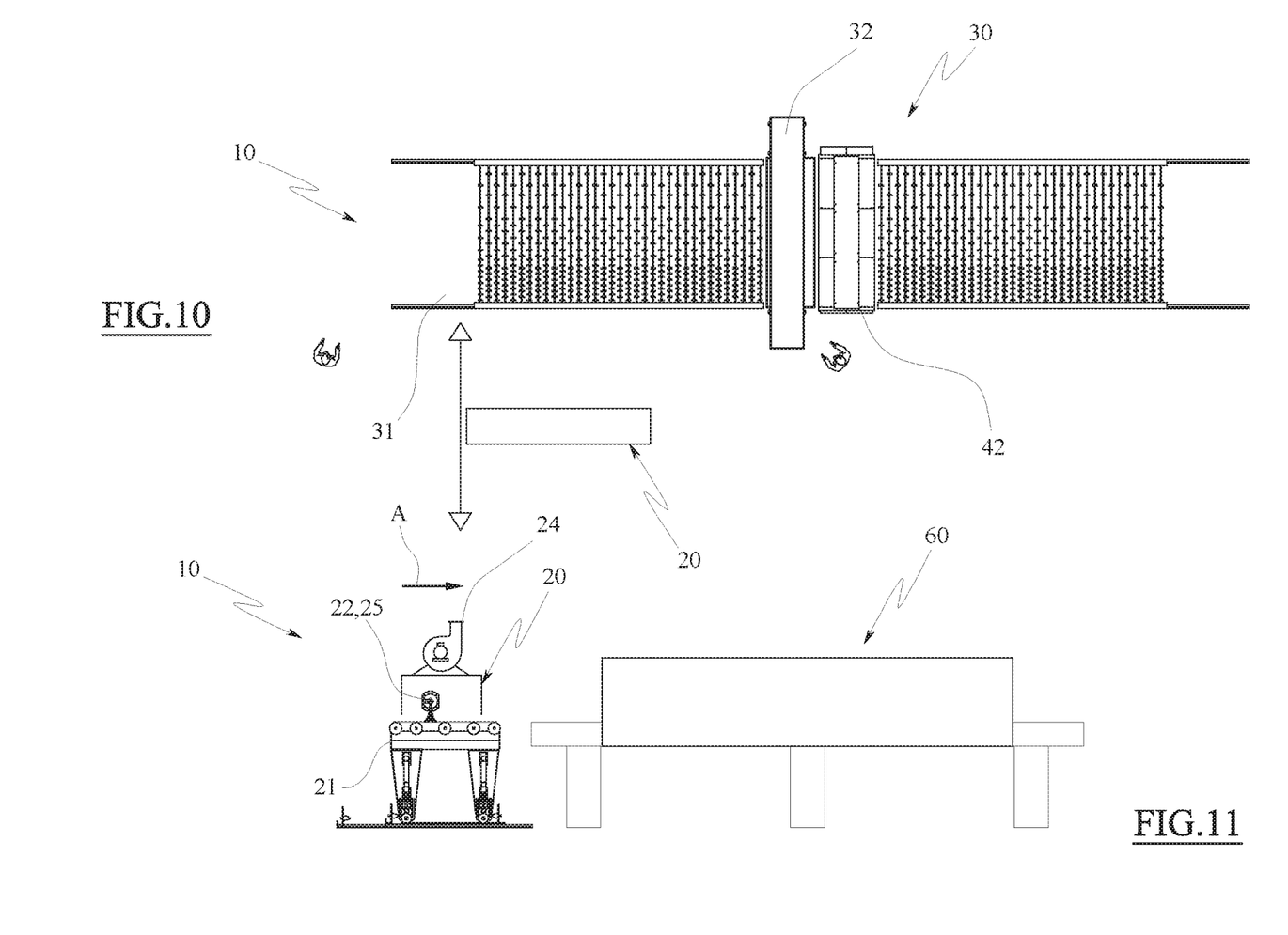
FIG. 10 is a schematic plan view of a fourth embodiment of a plant for the treatment of glass articles according to the invention.
FIG. 11 is a schematic side elevation view of a second variant of a plant for the treatment of glass articles according to the invention.

Alternatively, the feeding direction C imposed by the roller conveyor 31 of the decorating machine 30 may be orthogonal to the feeding direction A imposed by the roller conveyor 21 of the cleaning machine 20, see FIG. 10.

Figure 1:
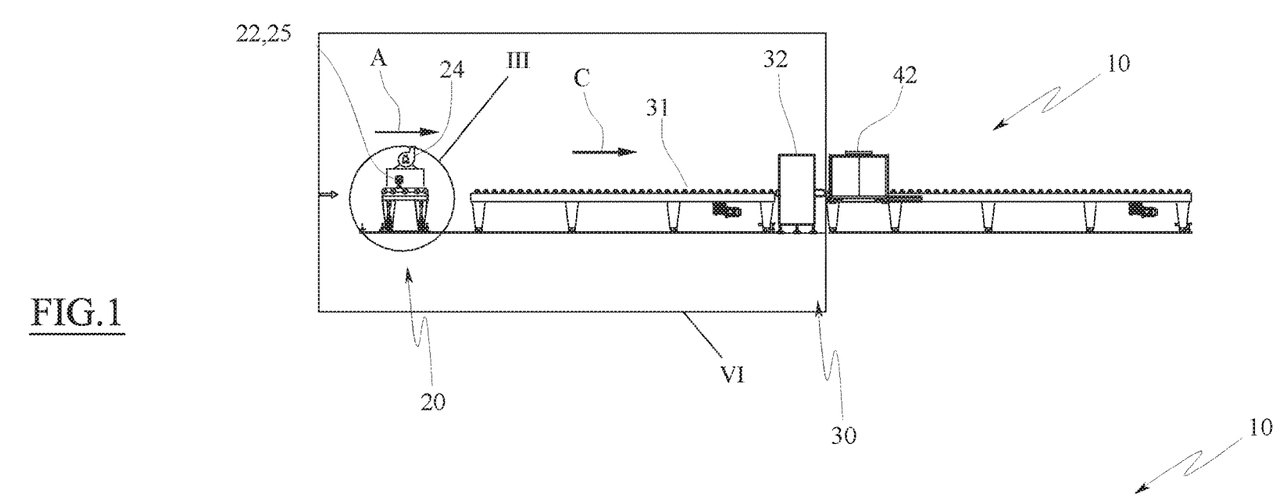
FIG. 1 is a side elevation view of a first variant of a plant for the treatment of glass articles according to the invention.
Figure 2:
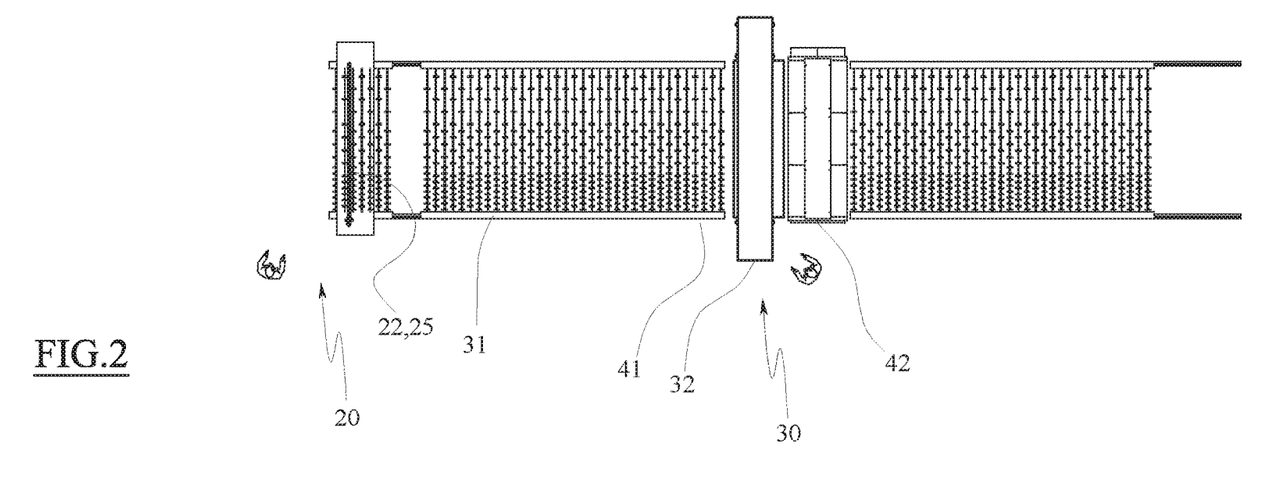
FIG. 2 is a schematic plan view of FIG. 1.

For example, the roller conveyor 31 is provided with common ground supports 313.

Figure 6:
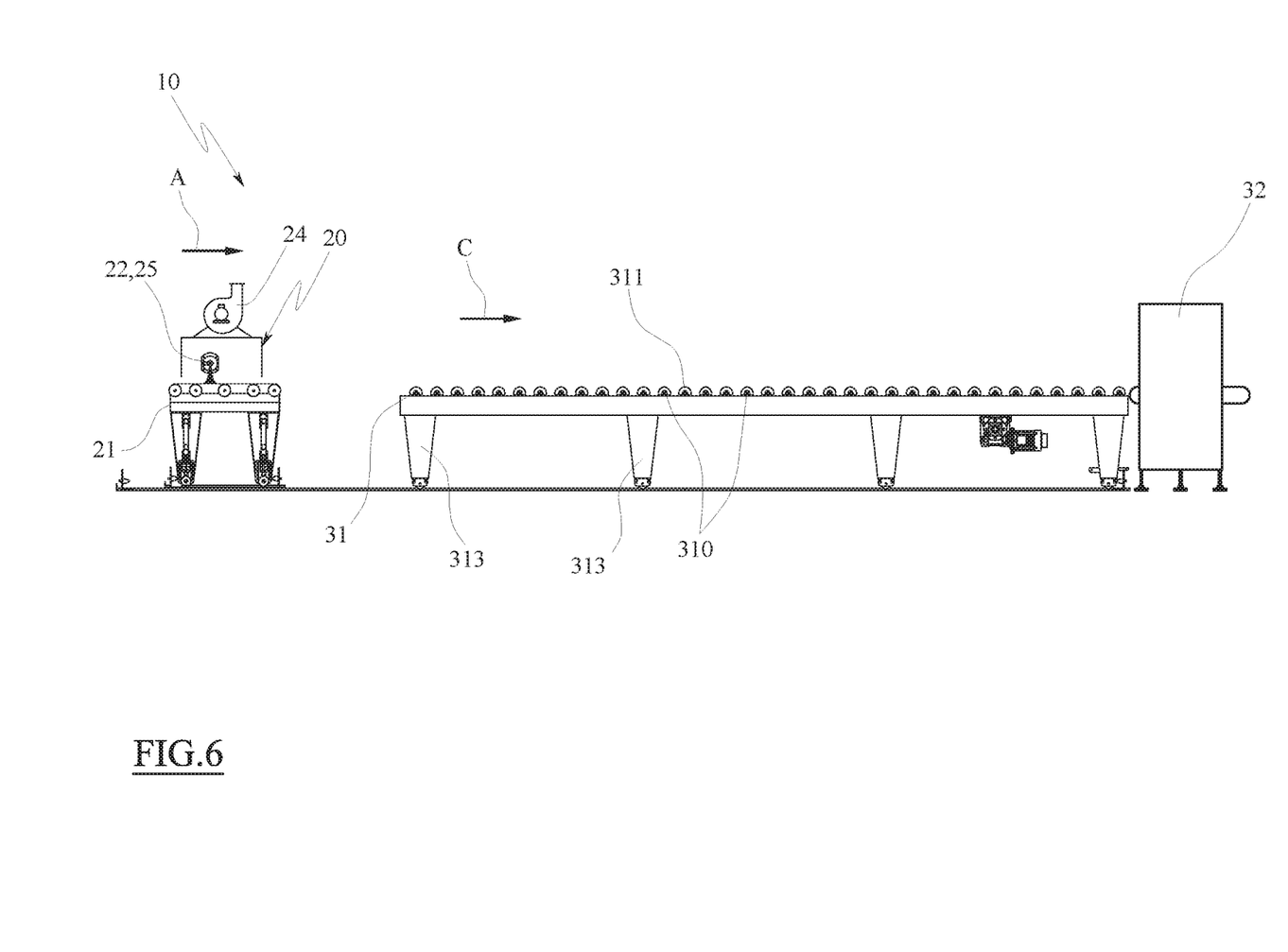
FIG. 6 is an enlarged view of block VI in FIG. 1.
Figure 7:
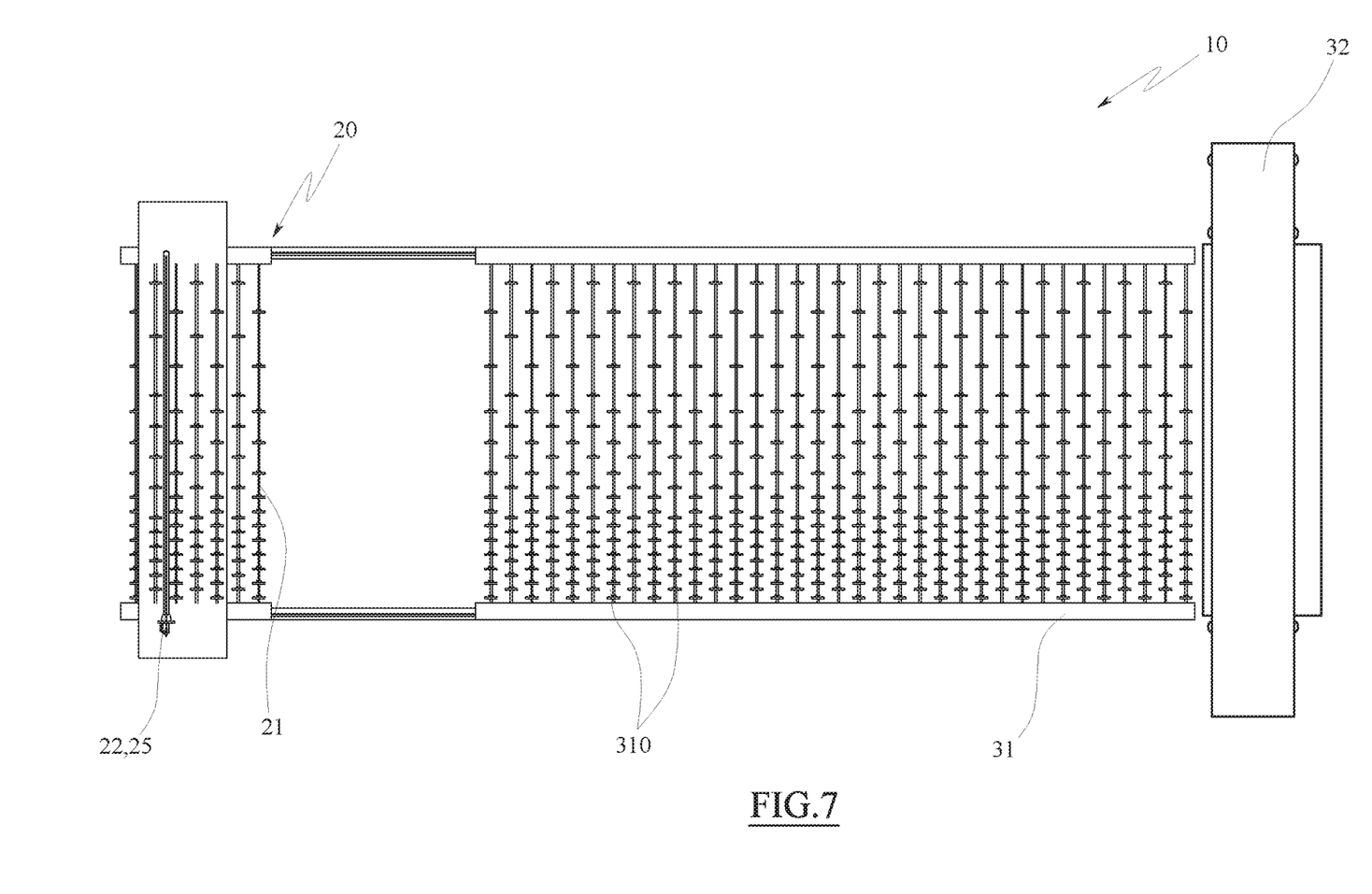
FIG. 7 is a plan view of FIG. 6.

A (digital) printing device 32 is installed above the roller conveyor 31, only schematically shown in the figures as it is of known type, which is provided with printing nozzles (ink-jet type).

Other embodiments may be provided with different types of printing devices suitable for decorating the surface G1 of the glass article G, such as a screen printing machine or the like.

With respect to the feeding direction C, the printing device 32 is positioned in an intermediate stretch of the roller conveyor 31, ideally dividing it into an inlet section located upstream of the printing device 32 and an outlet section located downstream of the same.

The inlet section of the roller conveyor 31 may be provided with a centering system (not shown) which is adapted to guide the glass article G to take a predetermined position on the support surface 311.

The inlet section of the roller conveyor 31 of the decorating machine 30 comprises an access portion side-by-side and adjacent to an outlet portion of the outlet section of the roller conveyor 21 of the cleaning machine 20.

The surface G1, properly cleaned by the cleaning machine 20, which is capable of burning and removing any organic traces (of grease)—even the most persistent ones—from the surface G1, has a substantially homogeneous surface tension across the surface, thereby allowing adequate adhesion of the high definition decoration.

The decorating machine 30 may provide that the printing device 32 may translate back and forth along the feeding direction C of the roller conveyor 30, or on the roller conveyor itself.

The plant 10 may further comprise a dryer 42 located downstream of the printing device 32 with respect to the feeding direction C of the glass articles G on the roller conveyor 31. The dryer 42 is configured to permanently fix the decoration on the surface G1 of the glass article G.

The dryer 42 is supported by suitable means above the roller conveyor 31, i.e. above a portion of the outlet section thereof.

The dryer 42 can translate back and forth along the feeding direction C of the roller conveyor 31, or on the roller conveyor itself.

Figure 8:
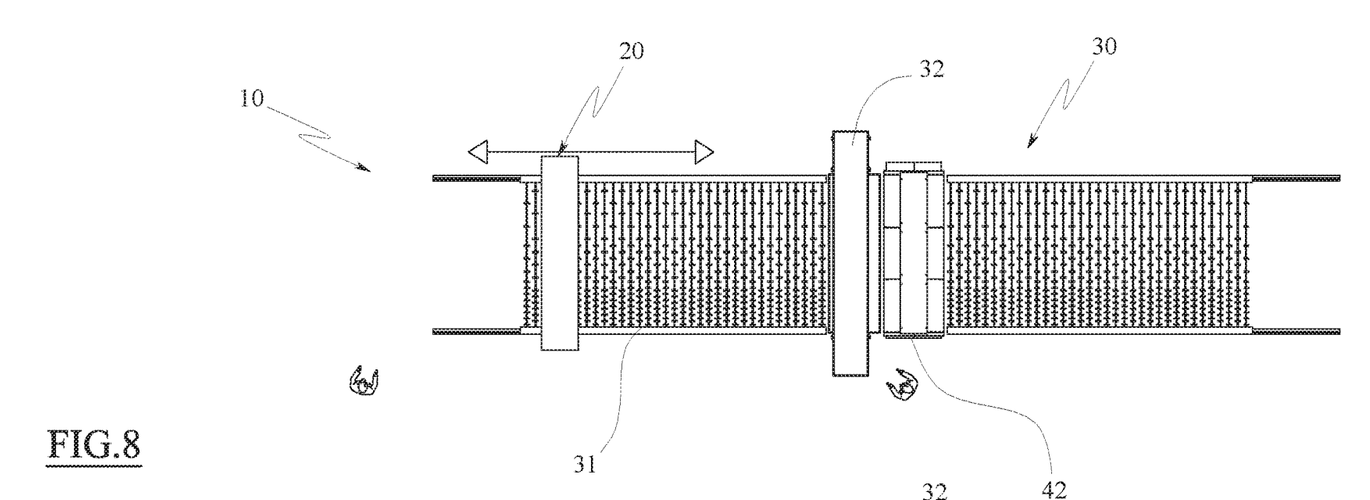
FIG. 8 is a schematic plan view of a second embodiment of a plant for the treatment of glass articles according to the invention.

In one embodiment of the plant 10 shown in FIG. 8, the cleaning machine 20 is arranged on the support surface 311 defined by the roller conveyor 31 of the decorating machine 30, which support surface 311 coincides with the support surface 211 of the cleaning machine.

In this case, the cleaning machine 20 is located at the inlet section of the roller conveyor 31.

For example, the cleaning machine 20 can translate back and forth along the feeding direction C of the roller conveyor 31, i.e. on the roller conveyor itself.

Figure 9:
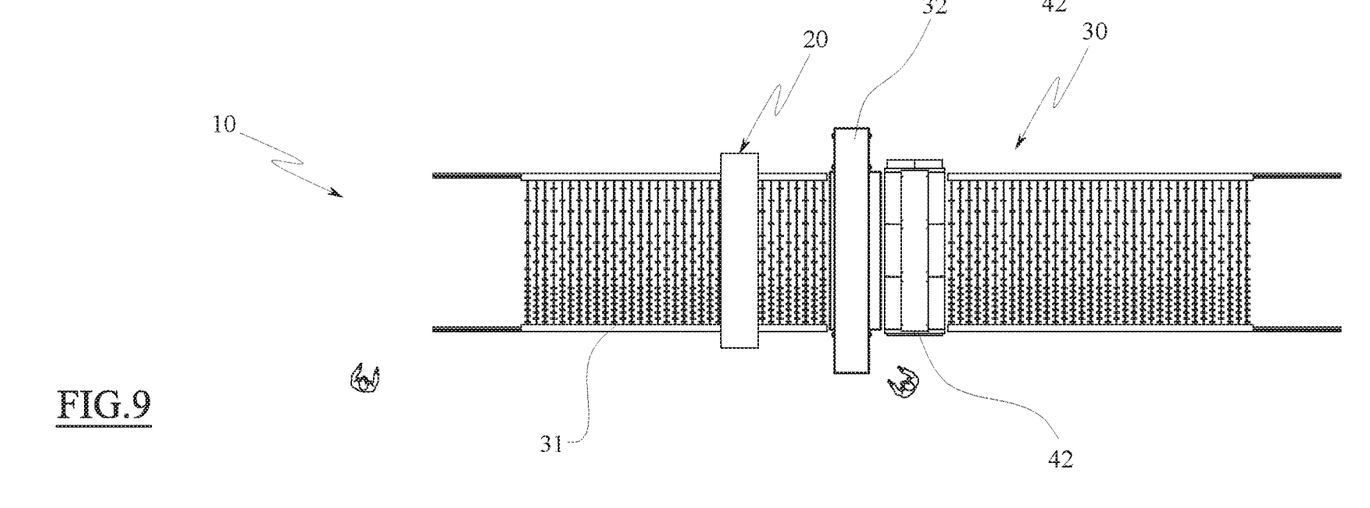
FIG. 9 is a schematic plan view of a third embodiment of a plant for the treatment of glass articles according to the invention.

In a different embodiment of the plant 10 shown in FIG. 9, the cleaning machine 20 is arranged on the support surface 311 defined by the roller conveyor 31 of the decorating machine 30, which support surface 311 coincides with the support surface 211 of the cleaning machine.

Also in this case, the cleaning machine 20 is located at the inlet section of the roller conveyor 31.

In a further embodiment of the plant 10 shown in FIG. 10, the cleaning machine 20 or the burner 22 is arranged laterally (and adjacent) to the support surface 311 defined by the roller conveyor 31 of the decorating machine 30, i.e. of the inlet section of the same.

In this case, the feeding direction A of the glass articles G on the roller conveyor 21 of the cleaning machine 20 is orthogonal to the feeding axis C of the glass articles G on the roller conveyor 31 of the decorating machine 30.

In the light of the foregoing, the operation of the first version of plant 10, shown in FIGS. 1, 2 and 6-10, is as follows.

The glass article G is fed along the cleaning machine 20, which cleans up the surface G1 of the same by removing any dirt traces.

In practice, the (whole) surface G1 of the glass article G is impinged by the flame F emitted by the burner 22 or by the flow of hot fluid H emitted by the thermo-blower 25 of the cleaning machine 20.

The glass article G, i.e. the surface G1 of the same, coming out of the cleaning machine 20, has a high degree of cleanliness, which means it has no organic and inorganic impurities, and at the same time is pre-heated to a temperature substantially lower than 100° C., for example of between 60° C. and 80° C.

The glass article G thus cleaned is then directed towards the decorating machine 30 to be decorated and then undergo additional processing steps, such as the final fixing of the decoration.

In a second version, shown in FIG. 11, the treatment device comprises a hardening furnace 60.

The surface G1 of the glass article G, in this case, may have been pre-coated with a protective coating, such as adherent to the surface G1 itself.

The heat flow (i.e. the flame F or the flow of hot fluid H) of the cleaning machine 20 is emitted so as to impinge the coating first, thereby removing the same, for example by combustion or thermal decomposition, from the surface G1.

The suction system 24 of the cleaning machine 20, where provided, eliminates any residues produced by the removal of the protective coating by combustion.

The hardening furnace 60, or any hardening furnace known in the industry, also comprises a roller conveyor, which generally comprises a plurality of rollers arranged mutually parallel and mutually coplanar to define a horizontal support surface for the glass articles G to be subjected to the hardening treatment.

The roller conveyor is placed at least partly inside a hardening chamber provided with heating elements configured to run heating cycles for heating, with each cycle, the hardening chamber and thus the glass article G to be subjected to hardening up to maximum temperatures of between 550° C. and 750° C.

For example, the hardening furnace 60 may comprise controlled cooling means for controlling the cooling of the glass articles G according to a predetermined cooling curve.

In the light of the foregoing, the operation of the second version of plant 10, shown in FIG. 11, is as follows.

The glass article G to be subjected to the hardening treatment is first fed through the cleaning machine 20, which removes the protective coating from the surface G1 of the glass article G, also removing any dirt traces and/or residues of the protective coating itself.

In practice, the (whole) surface G1 covered with the protective coating is impinged by the heat flow (i.e. the flame F or the flow of hot fluid) up to the complete removal of the protective coating from the surface G1 of the glass article G.

The glass article G thus cleaned from the protective coating and pre-heated is then directed towards the hardening furnace 60, where it is taken over by the roller conveyor thereof, so as to enter the hardening chamber and follow a preset hardening cycle (heating and cooling curve) specific to the particular glass article G.

The glass article G thus hardened can then be subjected to further processing steps, such as decoration, packaging or others.

Several changes and variations may be made to the invention thus conceived, all falling within the scope of the inventive concept.

Moreover, all details can be replaced with other technically equivalent elements.

In practice, the materials used as well as the shapes and sizes may be any according to the requirements, without departing from the protection scope of the following claims.

The invention claimed is:

1. A cleaning machine of glass articles, comprising:
a support for supporting a glass article; and
a heating device located in the vicinity of the support, at a distance therefrom, and configured to emit a heat flow in the direction of a surface of the glass article supported by the support, wherein the heating device comprises an emitter element of the heat flow comprising a body that is elongated along a longitudinal axis provided with a cylindrical axial cavity and with an elongated through slit, which through slit places in communication the interior of the axial cavity with the exterior of the elongated body of the emitter element and faces towards the support so as to emit the heat flow which, from the interior of the axial cavity, comes out through the elongated slit and is mainly directed in the radial direction with respect to the longitudinal axis of the emitter element.

2. The cleaning machine according to claim 1, wherein the heating device comprises at least one gas burner configured to emit a flame in the direction of the surface of the glass article supported by the support.

3. The cleaning machine according to claim 1, wherein the gas burner is a linear burner arranged with horizontal longitudinal axis aligned to a first horizontal direction.

4. The cleaning machine according to claim 1, wherein the heating device comprises at least one thermo-blower configured to emit a flow of a hot fluid in the direction of the surface of the glass article supported by the support.

5. The cleaning machine according to claim 1, wherein the support comprises a horizontal support surface which comprises feeding means for feeding the supported glass article along a predetermined feeding direction.

6. The cleaning machine according to claim 5, wherein said feeding means comprise a roller conveyor, whose rollers globally define the support surface.

7. The cleaning machine according to claim 1, wherein the heating device comprises a plurality of emitter elements of the heat flow, elongated and with mutually parallel and offset longitudinal axes, so as to cover an entire width of the surface of the glass article, wherein each emitter element comprises an elongated slit facing towards the support and adapted to emit the heat flow towards the surface of the glass article, wherein the projection of each elongated slit on the longitudinal axis of an adjoining elongated slit is adjacent and not superposed to said adjoining elongated slit.

8. A plant for treating glass articles comprising:
a cleaning machine, according to claim 1, and
a treatment device configured to treat the glass article exiting from the cleaning machine.

9. The plant according to claim 8, wherein the treatment device comprises a decorating machine configured to lay a decoration on the surface of the glass article exiting from the cleaning machine.

10. The plant according to claim 8, wherein the treatment device comprises a hardening furnace of the glass article configured to perform a hardening treatment on the glass article exiting from the cleaning machine.

11. A cleaning machine of glass articles, comprising:
a support for supporting a glass article; and
a heating device located in the vicinity of the support, at a distance therefrom, and configured to emit a heat flow in the direction of a surface of the glass article supported by the support, wherein the heating device comprises a plurality of emitter elements of the heat flow, elongated and with mutually parallel and offset longitudinal axes, so as to cover an entire width of the surface of the glass article, wherein each emitter element comprises an elongated slit facing towards the support and adapted to emit the heat flow towards the surface of the glass article, wherein the projection of each elongated slit on the longitudinal axis of an adjoining elongated slit is adjacent and not superposed to said adjoining elongated slit.

12. A plant for treating glass articles comprising:
a cleaning machine, according to claim 11, and
a treatment device configured to treat the glass article exiting from the cleaning machine.

13. The cleaning machine according to claim 11, wherein the each of the emitter elements comprises at least one gas burner configured to emit a flame in the direction of the surface of the glass article supported by the support.

14. The cleaning machine according to claim 13, wherein the gas burner is a linear burner arranged with horizontal longitudinal axis aligned to a first horizontal direction.

15. The cleaning machine according to claim 11, wherein each of the emitter elements comprises at least one thermo-blower configured to emit a flow of a hot fluid in the direction of the surface of the glass article supported by the support.

16. The cleaning machine according to claim 11, wherein the support comprises a horizontal support surface which comprises feeding means for feeding the supported glass article along a predetermined feeding direction.

17. The cleaning machine according to claim 16, wherein said feeding means comprise a roller conveyor, whose rollers globally define the support surface.

* * * * *